Mar. 13, 1923.                                                      1,448,229
J. J. A. MILLER ET AL
DASHPOT
Filed Jan. 5, 1920

INVENTORS
By John J. A. Miller.
William A. Weigele.
H. S. Bailey
ATTORNEY

Patented Mar. 13, 1923.

1,448,229

UNITED STATES PATENT OFFICE.

JOHN J. A. MILLER AND WILLIAM A. WEIGELE, OF DENVER, COLORADO, ASSIGNORS, BY DIRECT AND MESNE ASSIGNMENTS, TO THE AUTOMATIC FURNACE OXIDATOR AND MANUFACTURING COMPANY, OF DENVER, COLORADO, A CORPORATION OF COLORADO.

DASHPOT.

Original application filed December 15, 1919, Serial No. 344,859. Divided and this application filed January 5, 1920. Serial No. 349,545.

*To all whom it may concern:*

Be it known that we, JOHN J. A. MILLER and WILLIAM A. WEIGELE, citizens of the United States of America, residing at the city and county of Denver and State of Colorado, have invented a new and useful Dashpot, of which the following is a specification.

Our invention relates to improvements in liquid controlled gravity valves, and particularly to valves of this character which are employed in closing the air inlet dampers of furnace doors at a predetermined time after the said damper has been opened. Such a valve being shown in connection with an application entitled Oil controlled furnace door attachments for effecting fuel combustion in furnaces, which was filed by us on December 15, 1919, Serial No. 344,859, of which the present is a divisional application.

The object of this invention is to provide a valve which is adapted to be manually raised, but which drops by gravity through a body of suitable liquid, preferably oil, means being provided for determining the rapidity of the drop of the said valve.

Further, to provide an oil controlled, gravity valve comprising an oil holding cylinder, and a piston therein having a rod adapted to be connected to an object to impart movement thereto, said piston having an opening extending through the same, and an adjustable valve for nearly closing said opening, said valve being moved away from the opening on the up stroke of the piston by the pressure of oil from above, and spring actuated in a counter direction to the descent of the piston, whereby the said valve is moved toward and close to the opening in the piston, on the down stroke of the same, thus controlling the flow of oil through the piston and thereby retarding its descent, the upper head or cap of the said oil cylinder being concavo-convex, and provided with apertures which permit oil carried through the head by the piston rod, to flow back into the cylinder.

The valve hereinafter described may be used for any purpose for which it is adapted, and in order to show one way in which it may be applied, we have illustrated it as forming part of the mechanism comprising our pending application above referred to.

Figure 1:
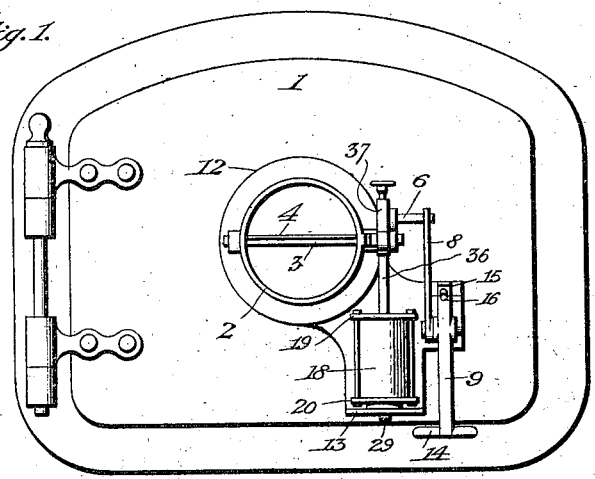
Figure 1 is a front elevation of a furnace door having an inlet pipe and a damper therein, showing the application of the improved oil valve as a means of opening and closing the same damper.
Figure 5:
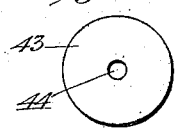
Fig. 5 is a plan view of the disk valve for controlling the opening through the piston.
Figure 2:
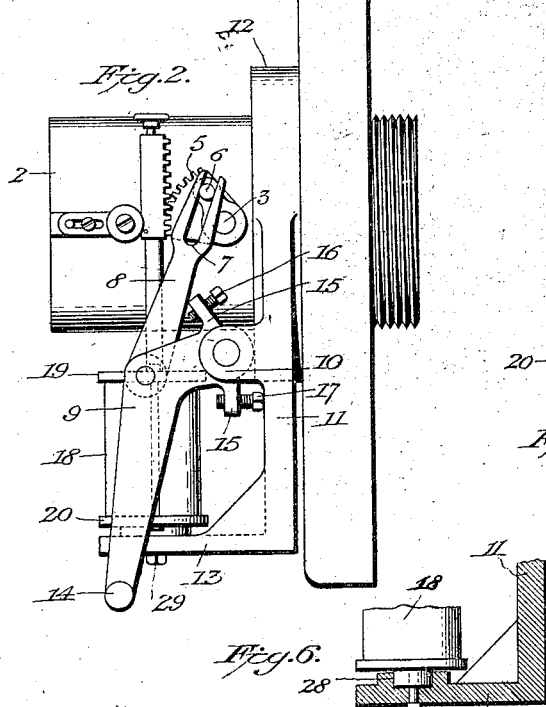
Fig. 2 is a side elevation of Figure 1, showing the connecting elements between the piston rod of the improved valve, and the damper rod, whereby the up and down stroke of the rod effects the opening and closing of the damper.

Referring to the accompanying drawings:

The numeral 1, indicates a furnace door, and 2, an air pipe extending through the same, having a transverse damper rod 3, to which is secured a damper 4. One end of the damper rod has a toothed segment 5, secured thereon, from which projects a stem-like tappet 6, the outer end of which lies in the bifurcated end 7, of a vertically disposed arm 8, the lower end of which is pivotally attached to an inverted L-shaped lever 9, at the intersection of the vertically disposed portion of said lever with its horizontally disposed portion, the free end of the latter member of said lever being pivotally connected to ears 10, on a bracket 11, which is suitably secured to the furnace door, the said bracket having a ring portion 12, through which the pipe 2, passes, and a horizontal projection or shelf 13, to which the improved oil controlled gravity valve is secured. The lower end of the lever 9, terminates in a hand hold member 14, and the pivoted end of the lever is formed with oppositely disposed lugs 15, having threaded apertures in which are screwed stop bolts 16 and 17, the latter bolt being adapted to abut against the bracket 11, to define the downward swing of the lever, while the bolt 16, defines the upward swing of the lever, this lever forming the door-opening means.

The parts thus far mentioned form no part of the present invention, and are illustrated only to show one application of the improved oil valve or how the same may be employed to effect the closing of a furnace damper at a predetermined period after the damper has been opened, or in other words, to gradually close the damper during a given period of time.

The improved oil controlled gravity valve comprises a cylinder 18, having heads or caps 19 and 20, provided with annular bosses 21, which fit in the respective ends of the cylinder, and the caps are held in place by headed rods 22, which pass through holes in the caps, the ends of the rods being threaded to receive clamp nuts 23, which are screwed against the adjacent cap. The upper cap 19, is concavo-convex in form, and is provided with an axial piston rod hole 24, and surrounding this hole are a number of small drain holes 25. The concavo-convex form of the cap enables it to catch any oil which works through the axial piston rod hole, and this oil drips back into the cylinder through the holes 25, thus avoiding waste. The lower cylinder cap 20, may be so constructed as to enable it to be secured to any form of support made necessary by the use to which the valve is put.

In the present instance, the cap is formed with a central, depending circular lug 26, having a threaded axial hole 27, and this lug fits into a socket 28, in the shelf 13, of the bracket 11, which socket is preferably of slightly less depth than the length of the lug, and a bolt 29, is passed loosely through a hole in the shelf, and screwed into the hole 27 in the lug, until the head of the bolt is clamped tightly against the shelf, thereby tightly clamping the end of the lug against the bottom of the socket, by which the cylinder is firmly secured to the shelf.

Figure 3:
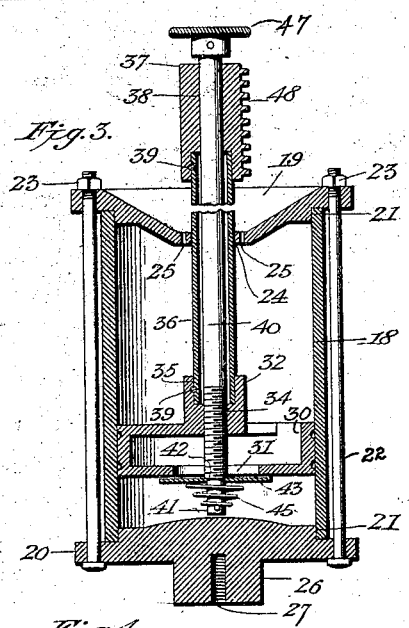
Fig. 3 is a vertical, sectional view of the improved oil controlled gravity valve.
Figure 4:
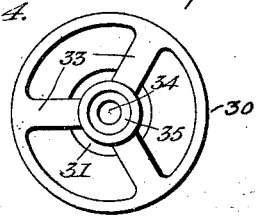
Fig. 4 is a plan view of the piston thereof.
Figure 6:
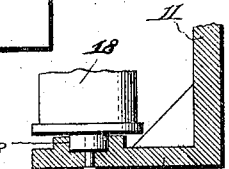
Fig. 6 is a fragmental sectional view, illustrating one way of securing the oil cylinder to a support.

Within the cylinder is placed a piston 30, which is of the form shown clearly in Figures 3 and 4, and comprises a hollow cylindrical portion having a bottom wall provided with a central hole 31, the upper end of the piston consisting simply of a central hub 32, which is integrally connected to the surrounding piston wall by spider arms 33. The hub 32, is provided with a central threaded aperture 34, and the hub is counterbored from its upper end, as shown at 35, and in this counterbore is secured the lower end of a hollow piston rod 36, which extends out through the axial hole 24, in the cylinder cap 19, a distance sufficient for the purpose for which it is intended, and upon the upper end of the piston is secured a member 37, having a central aperture 38, of slightly less diameter than the internal diameter of the hollow piston rod, and the lower end of the member 37, is counterbored for a suitable depth to receive the upper end of the piston rod, the opposite ends of the piston rod being preferably secured in their respective counterbores by pins 39, which pass through the piston hub 32, and member 37, respectively, and through recesses in the periphery of the piston rod, as clearly shown in Figure 3. A stem 40, which fits snugly but rotatably in the aperture of the member 37, is passed down through the said member and through the hollow piston, the lower portion of the stem being threaded and screwed through the threaded aperture 34, in the piston hub. The threaded portion of the stem terminates approximately a half inch from the extremity of the stem, and this latter portion 41, is of slightly less diameter than the remainder of the stem, thereby forming a shoulder 42. The reduced portion 41, is unthreaded and a disk valve 43, having an axial hole 44, is mounted on this reduced portion, and is normally held against the shoulder 42, by a spiral coil spring 45, which surrounds the reduced portion and is held under tension against the disk valve by a pin 46, in the lower end of the stem.

Upon the upper end of the stem 40, is secured a knurled thumb nut 47, by turning which the stem may be moved up or down through the threaded hole 34, in the piston hub, for a purpose to be presently described.

The member 37, on the upper end of the piston rod, is adapted to be connected with some mechanism to which it is desired to impart movement, the form of connection depending upon the character of the mechanism. In the present case, the purpose of the valve is to impart a quarter turn to the damper rod 3, and for this purpose the member 37, is provided with rack teeth 48, which mesh with the teeth of the segment 5, on the said damper rod 3. When the damper is in a closed position, the tappet 6, on the segment 5, lies in the crotch 7, of the arm 8, and when the door-opening lever 9, is raised, the arm 8, which is lifted by the said lever, in turn, swings the segment far enough to fully open the damper. This movement of the segment raises the piston rod and its piston, and when the lever 9, is released, it swings down to its normal position, leaving the segment free to be slowly moved down to its normal position by the gravity drop of the piston.

The cylinder 18, may be simply an air cylinder, but is preferably supplied with a suitable liquid, oil being preferred, to retard the descent of the piston, the time required for the piston to drop from its highest to its lowest position being determined by the nearness of the disk valve 43, to the bottom of the piston, by which the flow of oil through the hole 31, in the bottom of the piston is regulated, and the position of the disk with respect to the hole 31, is determined by adjusting the stem 40. When the piston rod and its piston is raised in the manner above described or by any other means, the oil above the piston passes through the hole 31, in the bottom of the piston, and out over the circumferential edge of the disk valve 43, which is of less diameter than the piston, the valve being forced away far enough from the bottom of the piston by the pressure of the oil, and against the pressure of the spring 45, to permit the free passage of the oil through the said hole 31.

The instant the piston begins to drop by gravity, the disk valve 43, under the combined pressure of the oil and the tension of the spring 45, is forced up against the shoulder 42, of the stem 40, by which the space between the disk and the bottom of the piston is defined, and the downward pressure on the oil, by the piston and its disk valve, forces the oil up between the disk and the bottom of the piston and through the hole 31, and thus the piston is permitted slowly to descend, the time required for its descent to the bottom of the cylinder being determined by the space between the bottom of the piston and the disk. As the piston descends, the segment is thereby turned to its normal position by which the damper is closed.

In the present application of the oil valve, the descent of the piston would be so retarded as to admit air to the combustion chamber of a furnace for a definite period after coaling, but for any purpose for which the valve may be employed to effect the movement of a mechanism, the descent of the piston may be regulated to effect the movement of the said mechanism within any required period of time.

Having described our invention, what we claim as new and desire to secure by Letters Patent, is:

1. The combination with a member adapted to be moved in opposite directions, of a hand operated element, a connection between said member and said element whereby said member may be operated in one direction, a gravity operated device for moving said member in the opposite direction comprising a liquid holding cylinder, a hollow piston therein having a bottom wall provided with a central passage, a rod connecting said piston to said member, a valve for controlling the flow of liquid through said passage, and a stem mounted on said rod and supporting said valve.

2. The combination with a member adapted to be moved in opposite directions, of a hand operated element, a connection between said member and said element whereby said member may be operated in one direction, a gravity operated device for moving said member in the opposite direction comprising a liquid holding cylinder, a hollow piston having a bottom wall provided with a central passage, a rod connecting said piston to said member, a valve for controlling the flow of liquid through said passage, a stem mounted on said rod and supporting said valve, and adjustable means for limiting the movement of said valve.

3. In an oil controlled gravity valve, an oil holding cylinder, a piston therein having a passage therethrough, a rod extending from said piston and adapted to be connected with a mechanism for the purpose of moving the same, a valve supporting stem, a valve carried by and movable with respect to said stem, said valve permitting the oil to flow through said passage, as the piston moves up and down, and means for limiting the movement of the valve toward or away from the piston.

4. In an oil controlled valve, an oil holding cylinder, a piston therein having a passage therethrough, a rod extending from said piston and adapted to be connected with a mechanism for the purpose of moving the same, a valve supporting stem, a valve carried by and movable with respect to said stem, said valve controlling the flow of oil through said passage, and means on said stem for limiting the movement of said valve.

5. In an oil controlled valve, an oil holding cylinder, a piston therein having a passage therethrough, a rod extending from said piston and adapted to be connected with a mechanism for the purpose of moving the same, a valve supporting stem, a valve carried by and movable on said stem, means for limiting the movement of said valve, and means for adjusting the position of said stem and valve with respect to said piston.

6. In an oil controlled gravity valve, an oil holding cylinder, a piston therein having a passage therethrough, a rod extending from said piston and adapted to be connected with a mechanism for the purpose of moving the same, an adjustable stem extending through said piston, a valve mounted on said stem for permitting the oil to flow through said passage as the valve moves up and down, said stem having a stop which defines the closing movement of the valve, and resilient means for normally holding the valve in engagement with said stop, but which permits the valve to move away from the mouth of the passage when the piston is moved in one direction.

7. In an oil controlled gravity valve, an oil holding cylinder, a piston therein having an oil passage therethrough, a rod extending from said piston, an adjustable stem extending through said piston rod and through said passage, a spring controlled valve slidably supported on said stem and adapted to control the flow of oil through said passage, a movable mechanism, means connecting the movable mechanism and piston rod, and means for raising the piston rod and its piston, whereby the mechanism is moved in one direction, said mechanism being moved in the opposite direction as the piston descends by gravity.

8. In an oil controlled gravity valve, an oil holding cylinder, a piston therein having a passage therethrough, a rod extending from said piston, a vertically adjustable stem extending through said rod and passage, a spring actuated valve slidably mounted on said stem below the entrance of said passage, to control the flow of oil through the same, a stop on said stem for defining the closing movement of said valve, means for raising the piston and rod, and means whereby said rod may be connected with a mechanism for moving the same.

9. In an oil controlled gravity valve, the combination with an oil holding cylinder, a piston therein having a passage therethrough, a hub, and a rod on said piston having a toothed portion, of a stem extending through said rod and having a threaded portion which passes through a threaded aperture in said hub, the lower end portion of the stem extending through the piston passage, and being of less diameter than the remainder of the stem to form a shoulder at the junction of the two diameters, a disk valve slidably mounted on the reduced portion of the stem, a coil spring for normally holding said valve against said shoulder, and a knurled thumb nut on the upper end of said stem for adjusting said rod, whereby the distance between said valve and the entrance to the piston passage may be varied.

10. In an oil controlled gravity valve, an oil holding cylinder, a hollow piston therein having a hub provided with a threaded hole, and openings through its opposite ends, a hollow piston rod secured in said hub, having a toothed portion at its upper end, a stem extending through said rod and in threaded engagement with the threaded hole in said hub, a sliding valve on the lower portion of said stem for controlling the opening in the lower end of the piston, a stop on the stem, a spring for normally holding said valve in engagement with said stop, and a thumb nut on said stem for adjusting the same to vary the distance between the valve and the bottom of the piston to define the flow of oil through the piston on its gravity stroke, said valve being moved away from the piston by the down flowing oil as the piston is raised.

In testimony whereof we affix our signatures in presence of two witnesses.

JOHN J. A. MILLER.
WILLIAM A. WEIGELE.

Witnesses:
G. SARGENT ELLIOTT,
ELIZABETH SMITH.